US012781647B2

(12) United States Patent (10) Patent No.: US 12,781,647 B2
Deokar et al. (45) Date of Patent: Nov. 3, 2026

(54) ROCKER SYSTEM WITH STOPPER ARRANGEMENT ON CAM SIDE

(71) Applicant: EATON INTELLIGENT POWER LIMITED, Dublin (IE)

(72) Inventors: Vikram Deokar, Pune (IN); Nicola Andrisani, Cumiana (IT); Ketaki A. Purkar, Pin (IN); Pratik Aher, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 118 days.

(21) Appl. No.: 18/875,999

(22) PCT Filed: Jun. 29, 2023

(86) PCT No.: PCT/EP2023/025301
§ 371 (c)(1),
(2) Date: Dec. 17, 2024

(87) PCT Pub. No.: WO2024/002523
PCT Pub. Date: Jan. 4, 2024

(65) Prior Publication Data

US 2025/0179944 A1 Jun. 5, 2025

(30) Foreign Application Priority Data

Jun. 29, 2022 (IN) ............................. 202211037369

(51) Int. Cl.
*F01L 1/18* (2006.01)
*F01L 1/24* (2006.01)
(Continued)

(52) U.S. Cl.
CPC ............. *F01L 1/181* (2013.01); *F01L 1/2411* (2013.01); *F01L 1/2416* (2013.01); *F01L 1/267* (2013.01);
(Continued)

(58) Field of Classification Search
CPC ................. F01L 1/181; F01L 2001/186; F01L 1/2411; F01L 1/267; F01L 1/46; F01L 2001/467;
(Continued)

(56) References Cited

U.S. PATENT DOCUMENTS

| | | | | |
|---|---|---|---|---|
| 10,400,639 | B2 | 9/2019 | Pham | |
| 10,895,175 | B2 | 1/2021 | Bogdanski | |
| 2003/0037635 | A1* | 2/2003 | Tsuchiyama ............ | F01L 1/181 74/569 |
| 2017/0145876 | A1* | 5/2017 | Pham ....................... | F01L 1/181 |

(Continued)

FOREIGN PATENT DOCUMENTS

| | | | |
|---|---|---|---|
| CN | 121630549 | A * | 3/2026 |
| EP | 3170997 | A1 | 5/2017 |

(Continued)

OTHER PUBLICATIONS

ISA/EP, International Search Report and Written Opinion of the International Searching Authority for PCT/EP2023/025301, mailed Oct. 12, 2023, 12 pages.

*Primary Examiner* — Laert Dounis
(74) *Attorney, Agent, or Firm* — Meunier Carlin & Curfman LLC

(57) ABSTRACT

A rocker arm assembly for actuating a valve. The rocker arm assembly including a rocker arm having a valve side and a cam side. The rocker arm being pivotable about a rocker shaft via actuation on the cam side. At least one roller assembly is attached to the rocker arm. A latch assembly is provided for selectively latching the at least one roller assembly to the rocker arm, wherein when the latch assembly is in a lost motion state the at least one roller assembly is free to pivot relative to the rocker arm and when the latch assembly is in an activated state the at least one roller assembly is pivotably coupled to the rocker arm.

15 Claims, 7 Drawing Sheets

(51) Int. Cl.

| | |
|---|---|
| ***F01L 1/26*** | (2006.01) |
| ***F01L 1/46*** | (2006.01) |
| ***F01L 13/00*** | (2006.01) |
| ***F02D 13/02*** | (2006.01) |

(52) U.S. Cl.
CPC ............. *F01L 1/46* (2013.01); *F01L 13/0036* (2013.01); *F01L 2001/186* (2013.01); *F01L 2001/467* (2013.01); *F01L 2013/0089* (2013.01); *F01L 2305/00* (2020.05); *F01L 2305/02* (2020.05); *F02D 13/0234* (2013.01)

(58) Field of Classification Search
CPC ........... F01L 13/0036; F01L 2013/0089; F01L 2305/02; F01L 1/2416; F02D 13/0234
USPC ....................... 123/90.16, 90.4, 90.44, 90.46
See application file for complete search history.

(56) References Cited

U.S. PATENT DOCUMENTS

| | | | | |
|---|---|---|---|---|
| 2017/0198610 | A1* | 7/2017 | Haefner | F01L 1/181 |
| 2018/0371961 | A1* | 12/2018 | Bogdanski | F01L 1/181 |
| 2019/0055858 | A1* | 2/2019 | Bogdanski | F16H 25/10 |
| 2019/0145289 | A1* | 5/2019 | Ferreira | F01L 13/065 123/90.55 |
| 2021/0348528 | A1* | 11/2021 | Radulescu | F01L 13/085 |
| 2023/0016116 | A1* | 1/2023 | Lahr | F01L 13/06 |

FOREIGN PATENT DOCUMENTS

| | | | | |
|---|---|---|---|---|
| EP | 3444451 | A1 | 2/2019 | |
| WO | 2017/157413 | A1 | 9/2017 | |
| WO | WO-2020020492 | A1 * | 1/2020 | F01L 1/181 |
| WO | 2020/216474 | A1 | 10/2020 | |
| WO | WO-2024228123 | A1 * | 11/2024 | F01L 13/0005 |

* cited by examiner

ROCKER SYSTEM WITH STOPPER ARRANGEMENT ON CAM SIDE

PRIORITY

This application is a national stage application under 35 U.S.C. 371 of PCT/EP2023/025301 filed Jun. 29, 2023, which claims the benefit of priority of Indian provisional patent application No. 202211037369, filed Jun. 29, 2022, the contents of which are incorporated herein by reference in their entirety.

FIELD

The subject application relates to, in general, an integrated device for a rocker arm assembly. More particularly, a mechanism for hindering a total leakdown of a hydraulic lash adjuster (HLA) of the rocker arm assembly.

BACKGROUND

Many internal combustion engines utilize a hydraulic lash adjuster (HLA) for use with a rocker arm assembly. During use, the HLA often experiences a complete leakdown or draining of fluid. It is desirable to have a mechanism that prevents the total leakdown of fluid from the HLA during operation of the rocker arm assembly.

SUMMARY OF THE INVENTION

There is provided a rocker arm assembly for actuating a valve. The rocker arm assembly includes a rocker arm having a valve side and a cam side. The rocker arm is pivotable about a rocker shaft via actuation on the cam side. A hydraulic lift assembly is positioned on the valve side of the rocker arm. The hydraulic lift assembly includes a plunger movable between an actuated position and an unactuated position. A check ball is provided for selectively locking the plunger in the actuated position. At least one roller assembly is attached to the rocker arm. A latch assembly is provided for selectively latching the at least one roller assembly to the rocker arm, wherein when the latch assembly is in a lost motion state the at least one roller assembly is free to pivot relative to the rocker arm and when the latch assembly is in an activated state the at least one roller assembly is pivotably coupled to the rocker arm.

In the foregoing embodiment, the at least one roller assembly includes a roller engageable with a cam. The roller is configured to pivot about the rocker shaft. A spring is provided for biasing the roller to a stopped position. A stopper is provided for stopping the roller at the stopped position.

In the foregoing embodiment, the stopper is a single pin.

In the foregoing embodiment, the stopper is at least one of threaded, welded or press-fitted to the rocker arm.

In the foregoing embodiment, the stopper engages a seat formed in the rocker arm.

In the foregoing embodiment, the rocker arm is Y-shaped with a first arm and a second arm.

In the foregoing embodiment, one end of the spring is fixed to the rocker arm and another end of the spring engages a bracket holding the second roller.

In the foregoing embodiment, the bracket is pivotable about the rocker shaft.

There is also provided a rocker arm assembly for actuating a valve. The rocker arm assembly includes a rocker arm having a valve side and a cam side. The rocker arm is pivotable about a rocker shaft via actuation of a first roller on the cam side. At least one roller assembly is attached to the rocker arm. A latch assembly is provided for selectively latching the at least one roller assembly to the rocker arm, wherein when the latch assembly is in a lost motion state the at least one roller assembly is free to pivot relative to the rocker arm and when the latch assembly is in an activated state the at least one roller assembly is pivotably coupled to the rocker arm.

In the foregoing embodiment, the at least one roller assembly includes a roller engageable with a cam. The roller is configured to pivot about the rocker shaft. A spring is provided for biasing the roller to a stopped position. A stopper is provided for stopping the roller at the stopped position.

In the foregoing embodiment, the stopper is a single pin.

In the foregoing embodiment, the stopper is at least one of threaded, welded or press-fitted to the rocker arm.

In the foregoing embodiment, the stopper engages a seat formed in the rocker arm.

In the foregoing embodiment, one end of the spring is fixed to the rocker arm and another end of the spring engages a bracket holding the second roller.

In the foregoing embodiment, the bracket is pivotable about the rocker shaft.

DETAILED DESCRIPTION

The following presents a description of the disclosure; however, aspects may be embodied in many different forms and should not be construed as limited to the embodiments set forth herein. Furthermore, the following examples may be provided alone or in combination with one or any combination of the examples discussed herein. Directional references such as "left" and "right" are for ease of reference to the figures.

Figure 1:
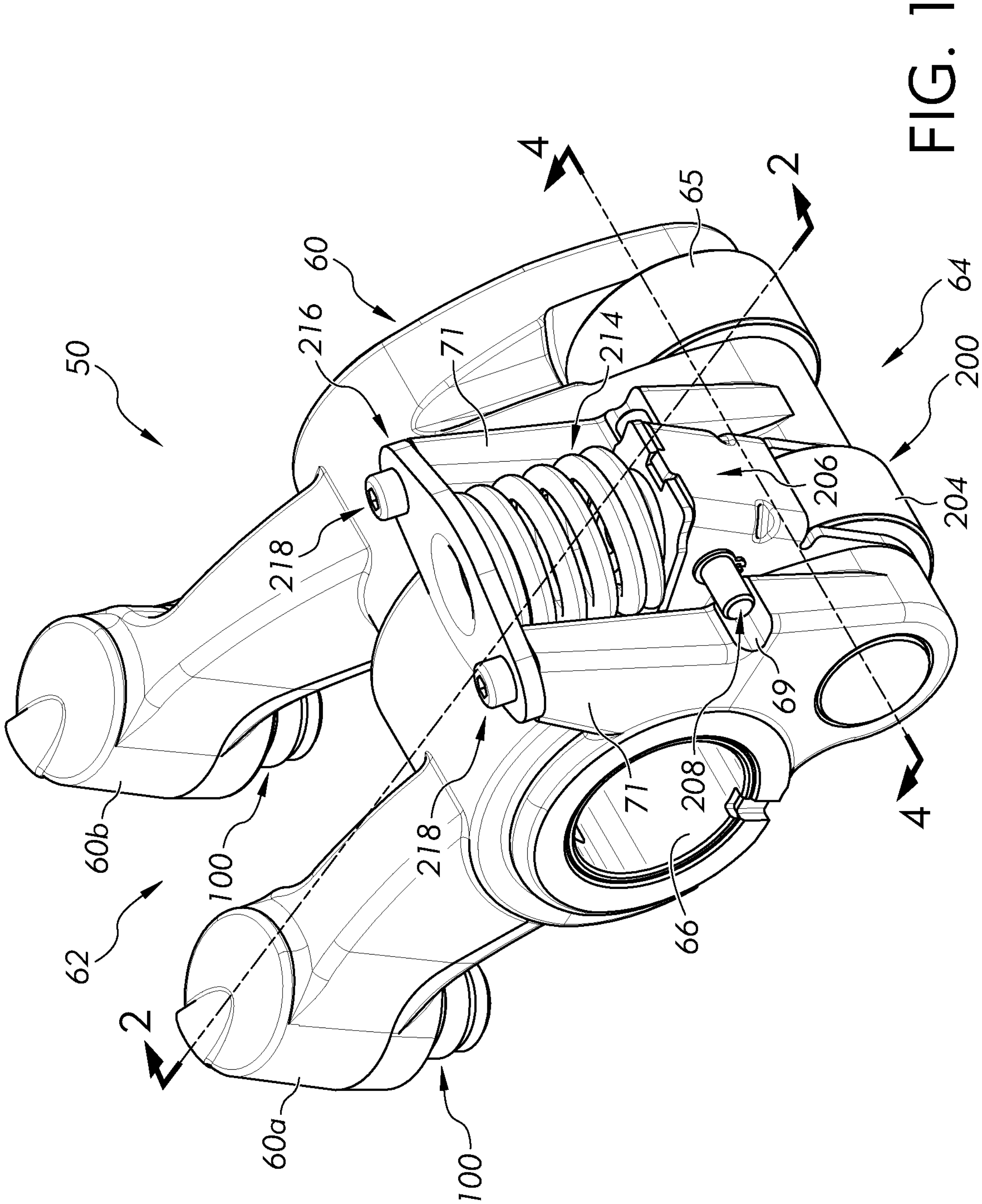
FIG. 1 is a perspective view of a rocker arm assembly.

Referring to FIG. 1, the rocker arm assembly 50 includes a rocker arm 60. In the embodiment illustrated, the rocker arm 60 is a Y-shaped rocker arm having a first arm 60*a* and a second arm 60*b*. It is contemplated that the rocker arm 60 could be a single rocker arm (not illustrated). A hydraulic lash adjuster (HLA) 100 is positioned on a valve side 62 of the rocker arm 60. The HLA 100 is positioned to selectively engage a distal end of a valve 80 (partially illustrated in FIGS. 2 and 3) when it is desired to adjust the lash of the valve 80. In the embodiment illustrated, the rocker arm 60 includes a rocker bore 66 for allowing the rocker arm 60 to pivot about a shaft (not shown) via actuation at a roller end

Figure 2:
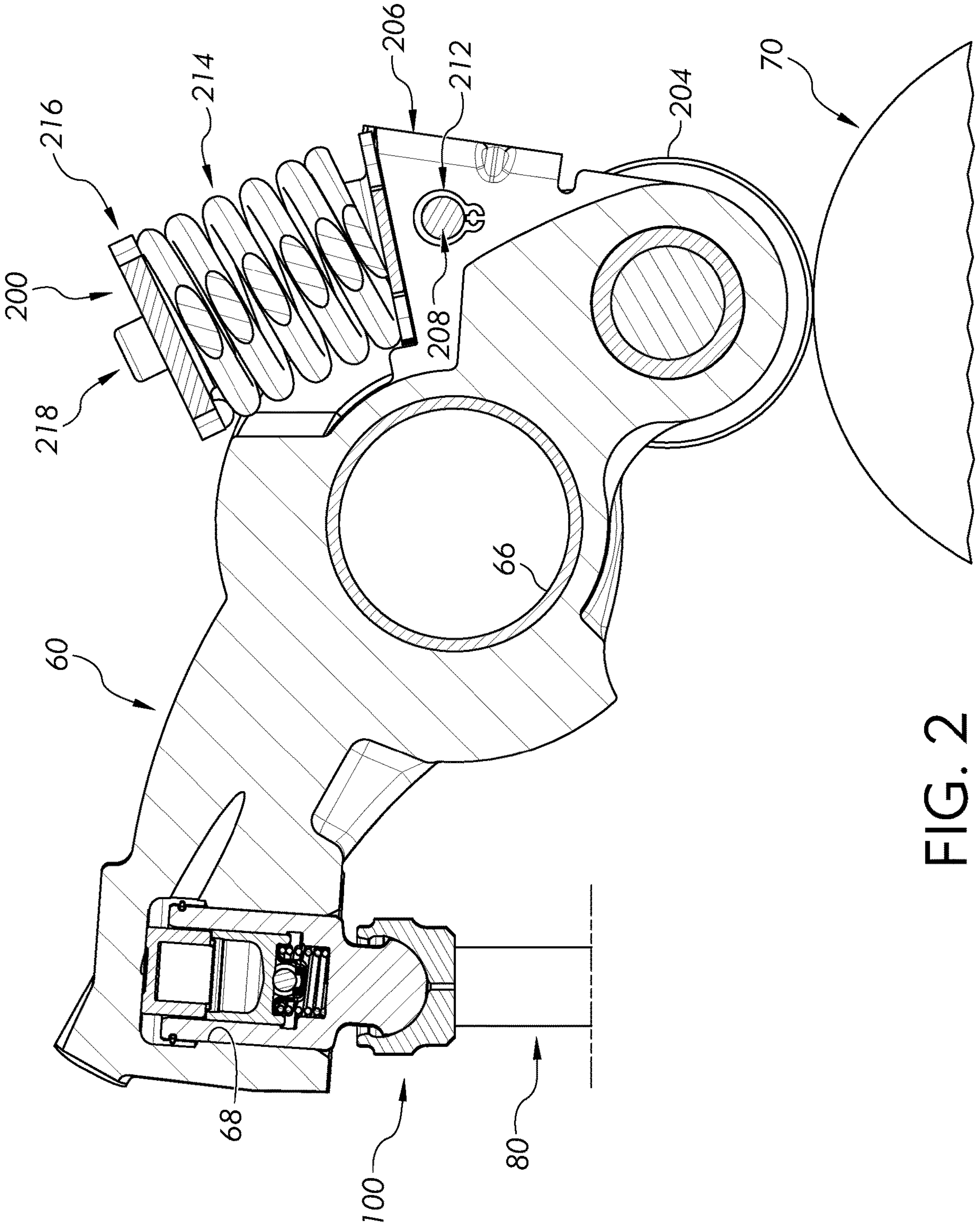
FIG. 2 is section view of the rocker arm assembly of FIG. 1 taken along line 2-2, illustrating a hydraulic lift assembly (HLA) in a deactivated state.

64 of the rocker arm 60 by a cam 70 (partially illustrated in FIG. 2). A first roller 65 is disposed at the roller end 64 for engaging the cam 70.

Figure 3:
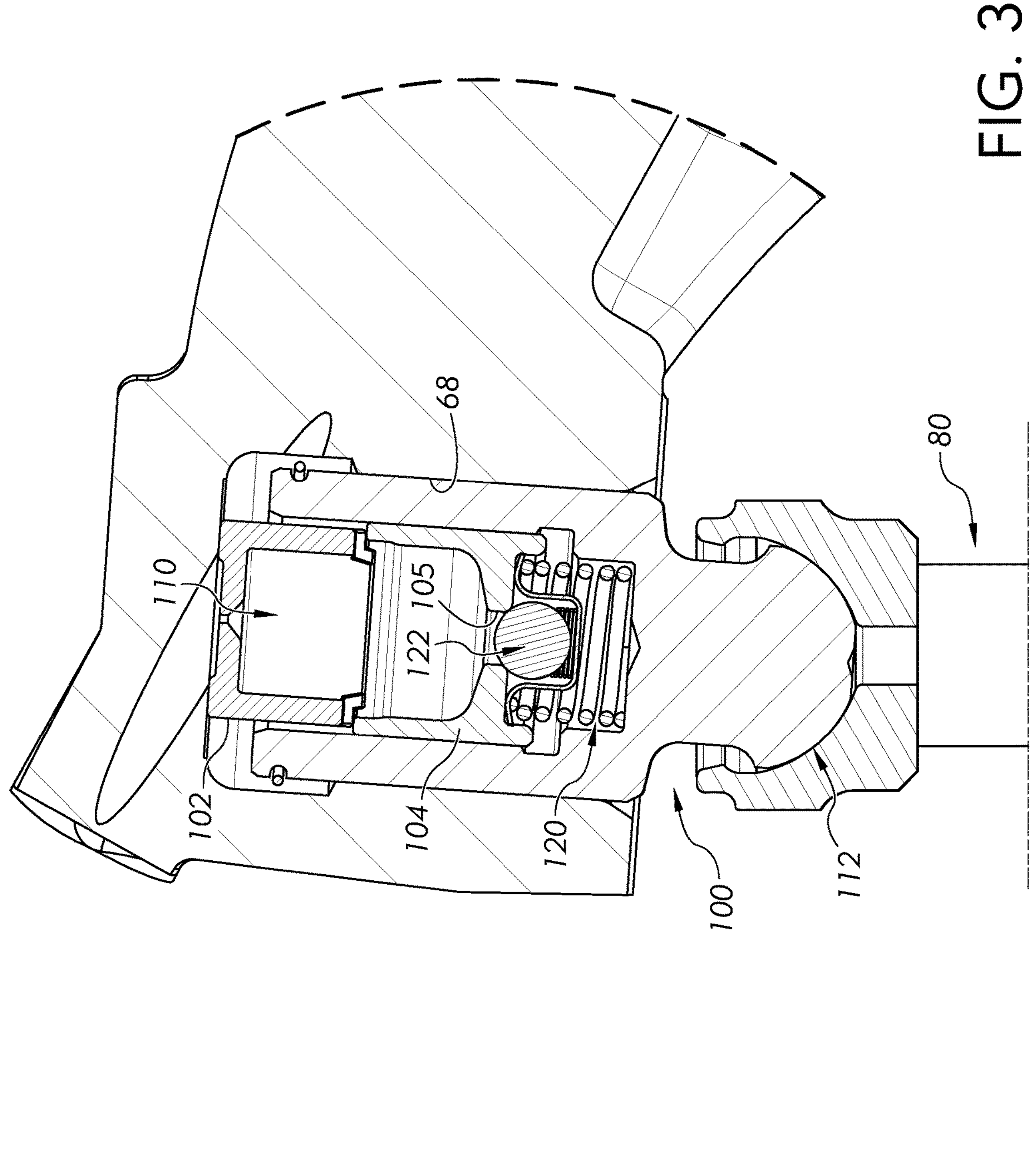
FIG. 3 is an enlarged section view of the HLA of FIG. 2.

Referring to FIGS. 2 and 3, the rocker arm 60 includes a bore 68 that is dimensioned to receive the HLA 100. In general, the HLA 100 includes an upper piston 102 and a lower piston 104 that together define a first fluid cavity 110 therebetween. The lower piston 104 and a plunger 112 of the HLA 100 define a second fluid cavity 120 therebetween. When it is desired to extend the plunger 112 from the bore 68, fluid is supplied to the first fluid cavity 110. A check ball 122 in the HLA 100 opens due to the force of the fluid flowing into the first fluid cavity 110 and allows the fluid to flow into and fill the second fluid cavity 120. As the first fluid cavity 110 and second fluid cavity 120 are filled, the plunger 112 extends from the bore 68 of the rocker arm 60 a predetermined distance to an extended position.

When the plunger 112 experiences a sudden force, e.g., from a spring (not shown) on the valve 80, the sudden application of force to the distal end of the plunger 112 causes the plunger 112 to move slightly toward the lower piston 104. This movement results in a sudden increase in pressure in the second fluid cavity 120 that causes the check ball 122 to seat against the lower piston 104 and to close an opening 105 extending through the lower piston 104. With the opening 105 is closed, pressurized fluid is "locked" into the second fluid cavity 120 and the entire HLA 100 acts as a solid component so that the force from the rocker arm assembly 50 may be transferred through the HLA 100 to the valve 80 to move the valve 80 to the desired position.

Once the resistance from the valve 80 is removed, e.g., when the rocker arm assembly 50 pivots to a position that does not apply a force to the valve 80, the resistance force from the spring (not shown) on the valve 80 is removed and the pressure in the second fluid cavity 120 is released. The fluid in the second fluid cavity 120 leaks into the surrounding environment as the plunger 112 returns to a retracted position.

Figure 4:
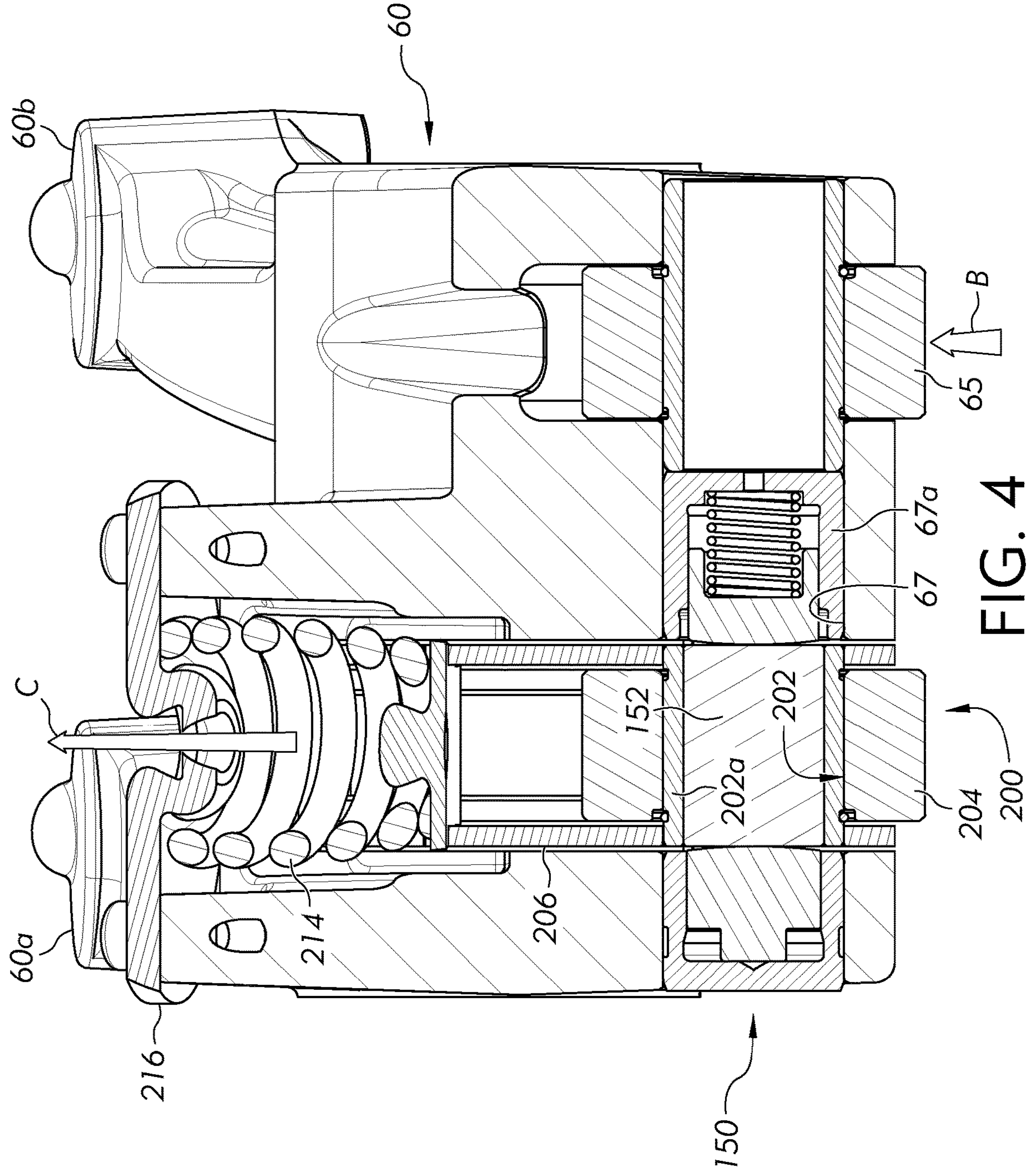
FIG. 4 is a section view of a latch assembly of the rocker arm assembly of FIG. 1 taken along line 4-4, illustrating the latch assembly in a lost motion state.

The rocker arm assembly 50 includes a latch assembly 150 for selectively latching or connecting a roller assembly 200 to the rocker arm 60. Referring to FIG. 4, the latch assembly 150, in general, includes a plug 152 that is movable in a bore 67 of the rocker arm 60 and a bore 202 of the roller assembly 200. In the embodiment illustrated in FIG. 4, the plug 152 moves within sleeves **67*a*, 202*a* in the rocker arm 60 and roller assembly 200, respectively. When in the deactivated position (shown in FIG. 4), the roller assembly 200 is unlatched from the rocker arm 60 such that pivoting of the rocker arm 60 about the rocker shaft (not shown) is independent or separate from the movement of the roller assembly 200 about the rocker shaft (not shown). In other words, the movement of the roller assembly 200 in the direction of arrow C is not coupled to the movement of the rocker arm 60 in the direction of arrow B. This uncoupling is also referred to as "lost motion" because the motion of the rocker arm 60 is not transmitted to the roller assembly 200, i.e., the motion of the rocker arm 60** is "lost."

Figure 5:
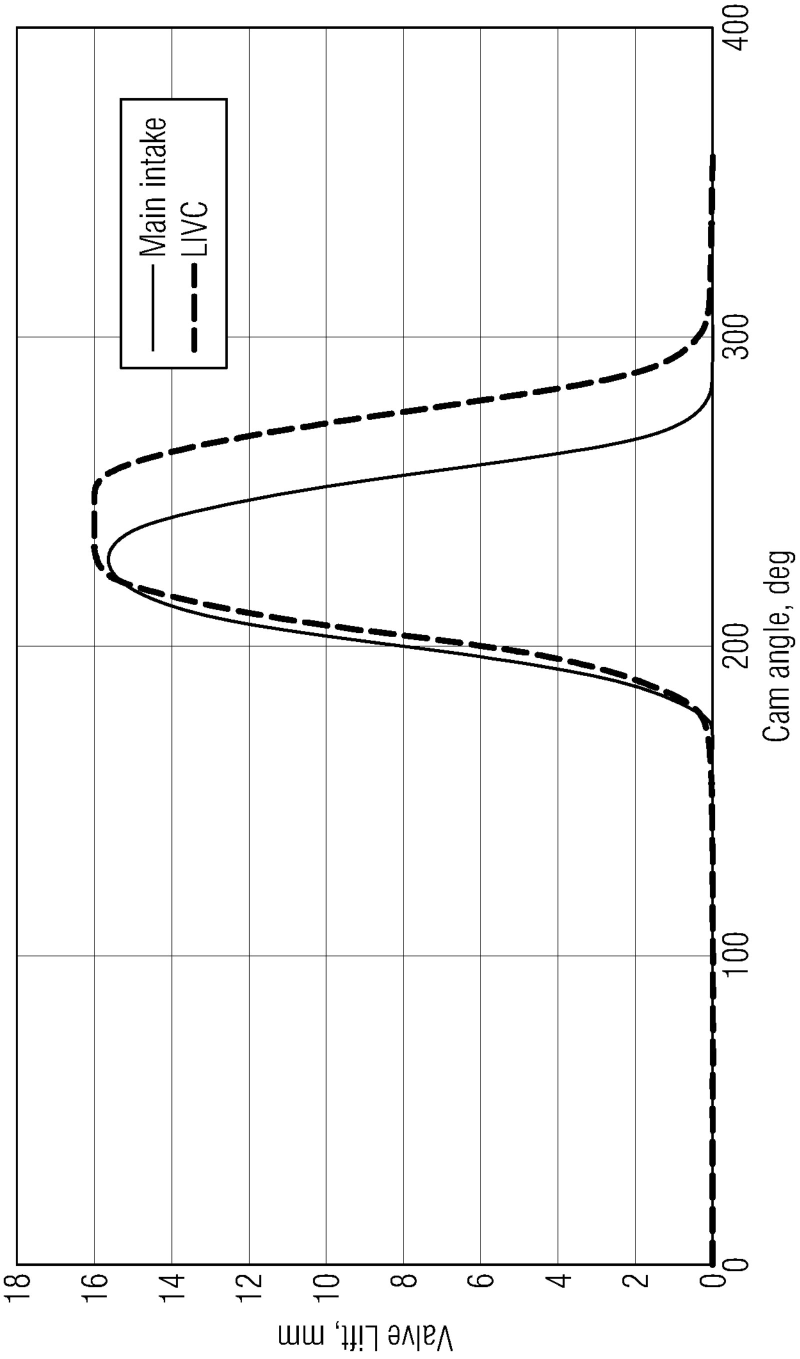
FIG. 5 is plot of valve lift vs. cam angle for the latch assembly in the lost motion state.

Referring to FIG. 5, when the latch assembly 150 is deactivated, i.e., the roller assembly 200 is uncoupled from the rocker arm 60. In this position, the valve lift of the valve 80 follows the solid line in FIG. 5.

Figure 6:
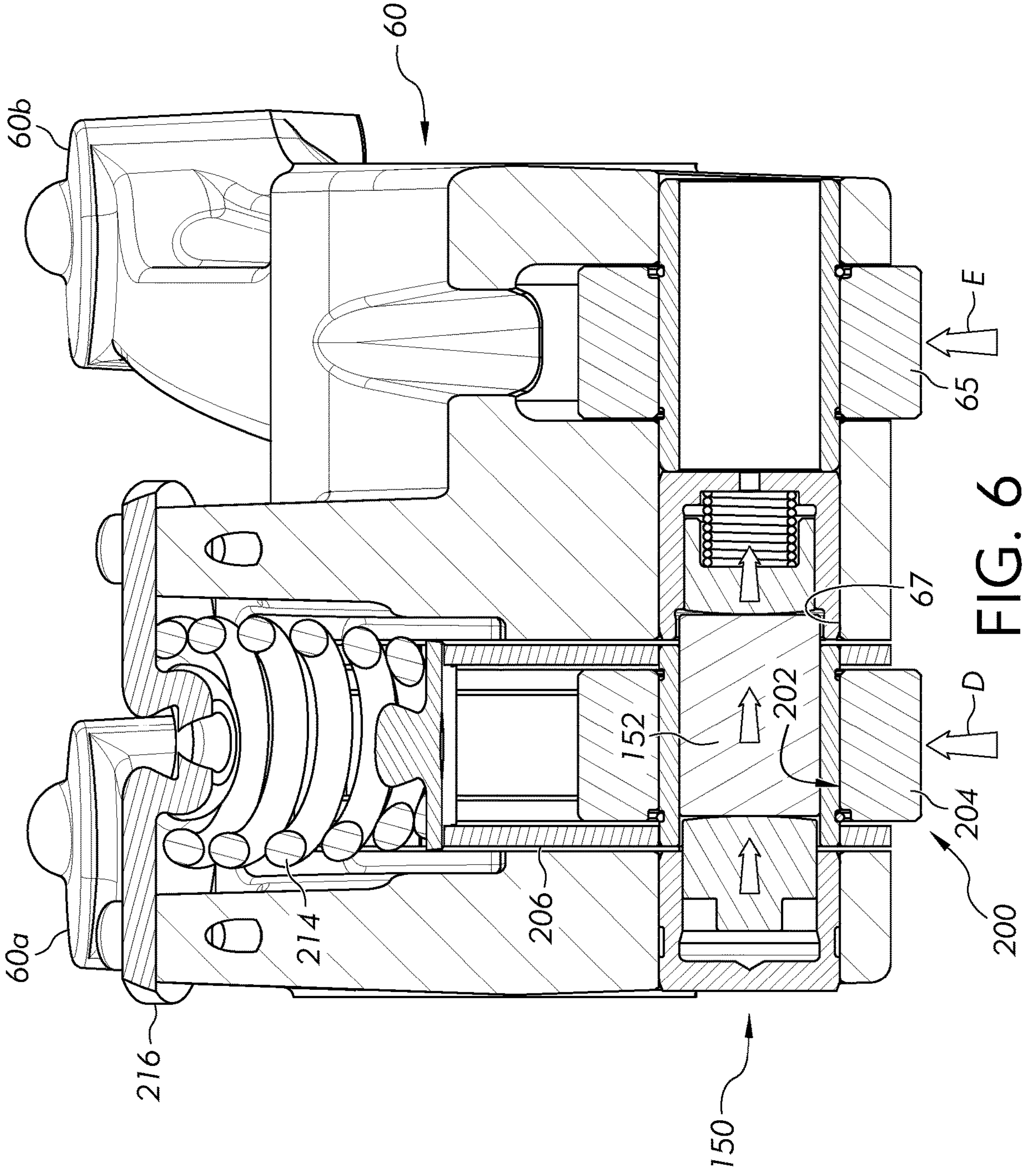
FIG. 6 is a section view of a latch assembly of the rocker arm assembly of FIG. 1 taken along line 4-4, illustrating the latch assembly in an activated state.
Figure 7:
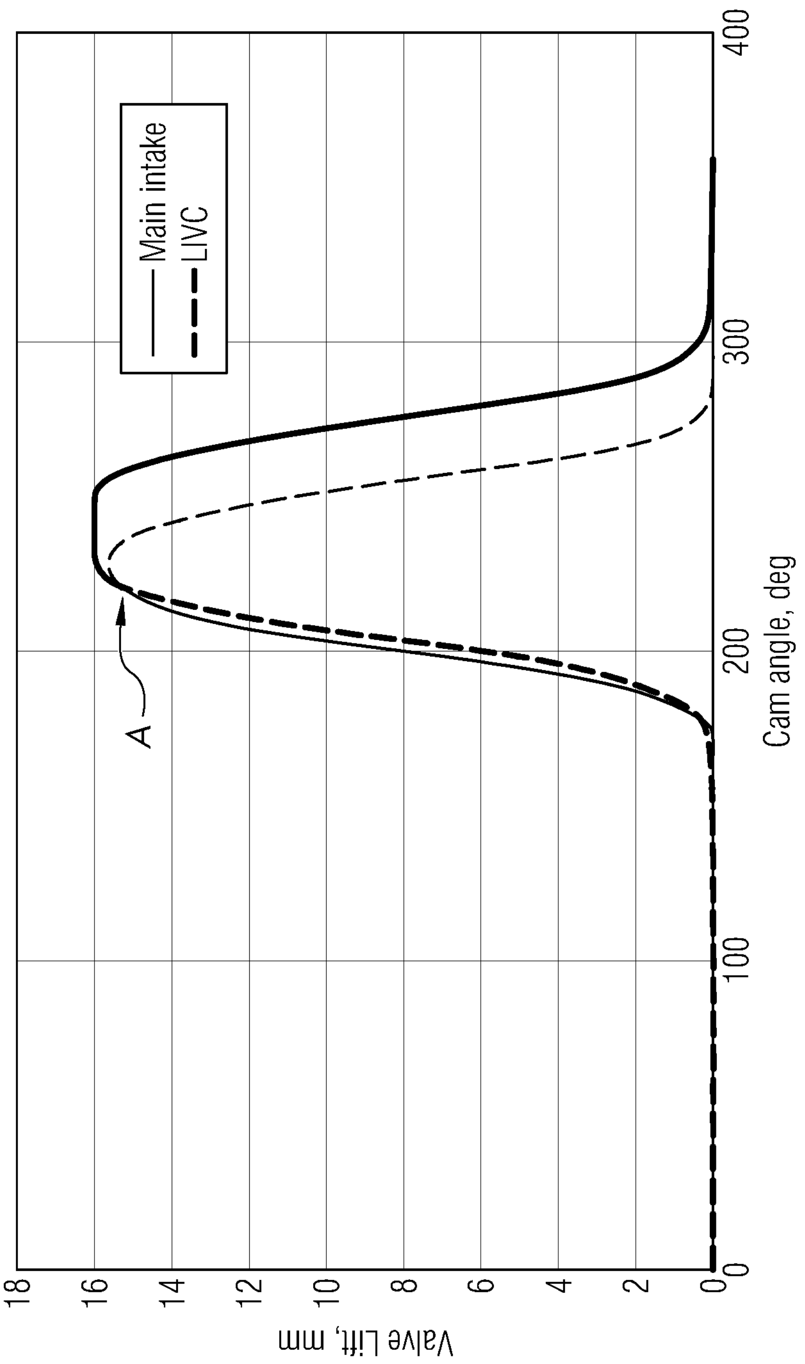
FIG. 7 is plot of valve lift vs. cam angle for the latch assembly in an activated state.

Referring to FIG. 6, when the latch assembly 150 is activated, the plug 152 is partially within the bore 67 of the rocker arm 60 and the bore 202 of the roller assembly 200. In this position, the roller assembly 200 is coupled to the rocker arm 60 such that they move as a unitary body about rocker shaft (not shown). In other words, movement of the roller assembly 200 in the direction of arrow D is coupled to the movement of the rocker arm 60 in the direction of arrow E. Referring to FIG. 7, when the roller assembly 200 is latched to the rocker arm 60, the displacement of the valve 80 is controlled by the rocker arm 60 up to a transition point A. After the transition point A, the displacement of the valve 80 is controlled by the roller assembly 200.

Referring back to FIGS. 1 and 2, the roller assembly 200, in general, includes a second roller 204 that is disposed in a bracket 206 that is pivotally about the rocker shaft (not shown). A stopper or pin 208 extends through the bracket 206 and is configured to engage a seat 69 formed in the rocker arm 60. Retaining pins 212 (FIG. 2) may be provided for retaining the stopper 208 in the bracket 206.

A spring 214 is disposed in the bracket 206 for biasing the bracket 206 such that the stopper 208 engages the seat 69. In the embodiment illustrated, one end of the spring 214 engages a plate 216 attached to the rocker arm 60 and an opposite end of the spring 214 engages the bracket 206. Bolts 218 may be provided for securing the plate 216 to mounting arms 71 of the rocker arm 60.

During operation, when the latch assembly 150 is in the activated position (FIG. 6), the force applied by the spring on the valve 80 is resisted by the cam 70 via the latch assembly 150 because the latch assembly 150 makes the roller assembly 200 and the rocker arm 60 function as a single unitary body. The stopper 208 and the seat 69 on the rocker arm 60 are positioned such that in this position the plug 152 aligns with the bores 67, 202 in the rocker arm 60 and the roller assembly 200, respectively. When the latch assembly 150 moves to the deactivated position (FIG. 4), the spring 214 maintains pressure on the HLA 100. By maintaining this force, the high pressure created in the second fluid cavity 120 of the HLA 100 remains so that the latch applied by the HLA 100 may be applied for sequential cycles.

The stopper pin 208 is position so that movement of the roller assembly 200 stops at the same position the roller assembly 200 would stop if the latch assembly 150 was activated. When the latch assembly 150 is activated, the rocker arm 60 and the roller assembly 200 (acting as a single unified body) applies pressure to the HLA 100. When the latch assembly 150 is deactivated, the spring 214 maintains pressure on the HLA 100. By maintaining pressure on the HLA 100 the high pressure created in the second fluid cavity 120 of the HLA 100 remains so that the latch applied by the HLA 100 may be applied for sequential cycles.

The stopper 208, thereby provides an apparatus that hinders total leak down of the HLA 100. By hindering total leak down, the stopper 208 may allow the HLA 100 to be used for sequential cycles It is contemplated that the stopper 208 may be a separate part that is added to the rocker arm 60, e.g., by threading, press fitting, welding, etc., or the stopper 208 may be a part integral with the rocker arm, e.g., attached during molding of the rocker arm or machined into a body of the rocker arm. In the embodiment illustrate, the stopper 208 is an elongated pin. It is contemplated that the stopper 208 may have other shapes such as tabs or protrusions that extend from the bracket 206 so long as they are positioned and dimensioned to engage the seat 69 of the rocker arm 60.

It will be apparent to those skilled in the art that various modifications and variations can be made without departing from the spirit and scope of the claimed invention.

What we claim is:

1. A rocker arm assembly for actuating a valve, the rocker arm assembly comprising:

a rocker arm having a valve side and a cam side, the rocker arm being pivotable about a rocker shaft via actuation on the cam side;

a hydraulic lift assembly positioned on the valve side of the rocker arm, the hydraulic lift assembly comprising:

a plunger movable between an extended position and a retracted position; and a check ball for selectively locking the plunger in the extended position;

at least one roller assembly attached to the rocker arm, the at least one roller assembly comprising:

a bracket pivotable relative to the rocker arm, the bracket comprising a stopper affixed to and extending therefrom;

a roller coupled to and disposed within the bracket, wherein the roller is engageable with a cam;

a spring comprising a first end engaged with the rocker arm and a second end engaged with the bracket, the spring biasing the bracket to a stopped position, wherein, in the stopped position, the stopper engages a seat formed in the rocker arm, and the engagement of the stopper with the seat alone prevents movement of the bracket in a first direction relative to the rocker arm; and a latch assembly for selectively latching the at least one roller assembly to the rocker arm, wherein when the latch assembly is in a lost motion state the at least one roller assembly is free to pivot relative to the rocker arm and when the latch assembly is in an activated state the at least one roller assembly is pivotably coupled to the rocker arm.

2. The rocker arm assembly of claim 1, wherein the latch assembly further comprises a plug that is selectively movable within a bore defined by the rocker arm and a bore defined by the at least one roller assembly to move the latch assembly between the lost motion state and the activated state, wherein the stopper and the seat on the rocker arm are positioned such that, when the latch assembly is in the activated state, the plug aligns with the bores in the rocker arm and the at least one roller assembly.

3. The rocker arm assembly of claim 1, wherein the stopper is a single pin.

4. The rocker arm assembly of claim 1, wherein the stopper is at least one of threaded, welded or press-fitted to the rocker arm.

5. The rocker arm assembly of claim 1, wherein the activated state of the latch assembly has an associated stop position, wherein, when the latch assembly is in the lost motion state, the stopped position of the stopper corresponds to the associated stop position of the latch assembly.

6. The rocker arm assembly of claim 1, wherein the rocker arm is Y-shaped with a first arm and a second arm.

7. The rocker arm assembly of claim 1, wherein one end of the spring is fixed to the rocker arm and another end of the spring engages the bracket holding the roller.

8. The rocker arm assembly of claim 1, wherein, when the latch assembly is in the lost motion state, the spring of the at least one roller assembly maintains pressure on the hydraulic lift assembly to maintain a pressure within a fluid cavity defined at least partially by the plunger of the hydraulic lift assembly.

9. A rocker arm assembly for actuating a valve, the rocker arm assembly comprising:

a rocker arm having a valve side and a cam side, the rocker arm being pivotable about a rocker shaft via actuation of a first roller on the cam side;

at least one roller assembly attached to the rocker arm, the at least one roller assembly comprising:

a bracket pivotable relative to the rocker arm, the bracket comprising a stopper affixed to and extending from the bracket;

a roller coupled to and disposed within the bracket, wherein the roller is engageable with a cam;

a spring comprising a first end engaged with the rocker arm and a second end engaged with the bracket, the spring biasing the bracket to a stopped position, wherein, in the stopped position, the stopper engages a seat formed in the rocker arm, and the engagement of the stopper with the seat alone prevents movement of the bracket in a first direction relative to the rocker arm;

a latch assembly for selectively latching the at least one roller assembly to the rocker arm, wherein when the latch assembly is in a lost motion state the at least one roller assembly is free to pivot relative to the rocker arm and when the latch assembly is in an activated state the at least one roller assembly is pivotably coupled to the rocker arm.

10. The rocker arm assembly of claim 9, wherein the latch assembly further comprises a plug that is selectively movable within a bore defined by the rocker arm and a bore defined by the at least one roller assembly to move the latch assembly between the lost motion state and the activated state, wherein the stopper and the seat on the rocker arm are positioned such that, when the latch assembly is in the activated state, the plug aligns with the bores in the rocker arm and the at least one roller assembly.

11. The rocker arm assembly of claim 9, wherein the stopper is a single pin.

12. The rocker arm assembly of claim 9, wherein the stopper is at least one of threaded, welded or press-fitted to the rocker arm.

13. The rocker arm assembly of claim 9, wherein the activated state of the latch assembly has an associated stop position, wherein, when the latch assembly is in the lost motion state, the stopped position of the stopper corresponds to the associated stop position of the latch assembly.

14. The rocker arm assembly of claim 9, wherein one end of the spring is fixed to the rocker arm and another end of the spring engages the bracket holding the roller.

15. The rocker arm assembly of claim 1, wherein the stopper hinders total leak down of the hydraulic lift assembly, enabling the hydraulic lift assembly to be used for sequential cycles.

* * * * *